(12) United States Patent
Lin et al.

(10) Patent No.: US 11,063,451 B2
(45) Date of Patent: Jul. 13, 2021

(54) BATTERY MANAGEMENT SYSTEM

(71) Applicant: FLYTECH TECHNOLOGY CO., LTD, Taipei (TW)

(72) Inventors: Chiung-Chi Lin, Taipei (TW); Hung-Lin Chang, Taipei (TW); Chin-Lung Yang, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 106 days.

(21) Appl. No.: 16/571,952

(22) Filed: Sep. 16, 2019

(65) Prior Publication Data
US 2020/0395766 A1 Dec. 17, 2020

(30) Foreign Application Priority Data
Jun. 14, 2019 (TW) .................. 108207627

(51) Int. Cl.
*H02J 7/00* (2006.01)
(52) U.S. Cl.
CPC .......... *H02J 7/0026* (2013.01); *H02J 7/0042* (2013.01)
(58) Field of Classification Search
CPC .................................................. H02J 7/0026
See application file for complete search history.

(56) References Cited

U.S. PATENT DOCUMENTS

2018/0169851 A1\* 6/2018 Radovich .............. H02J 7/0045
2019/0115768 A1\* 4/2019 Taylor, Jr. ......... G01R 19/16542

\* cited by examiner

*Primary Examiner* — Robert Grant
(74) *Attorney, Agent, or Firm* — WPAT, PC (57) ABSTRACT

A battery management system for a main system of an electronic device is provided. The battery management system is electrically connected with plural battery units. The battery management system includes plural insertion slots and a battery detachment protection device. The insertion slots electrically connected with the main system. The plural battery units are docked with the corresponding insertion slots. The battery detachment protection device is electrically connected with the main system. When an external force is applied to the battery detachment protection device, the battery detachment protection device generates a system protection sensing signal. In response to the system protection sensing signal, a power supply condition of at least one battery unit in the corresponding insertion slot is adjusted, and the at least one battery unit in the corresponding insertion slot is permitted to be detached from the corresponding insertion slot or positioned in the corresponding insertion slot.

9 Claims, 6 Drawing Sheets

BATTERY MANAGEMENT SYSTEM

FIELD OF THE INVENTION

The present invention relates to a battery management system, and more particularly to a battery management system with a battery detachment protection device.

BACKGROUND OF THE INVENTION

Generally, the commercially available electronic device is equipped with one battery unit. In case that the required electric quantity is higher, the electronic device is equipped with a battery management system to provide electric power to a main system of the electronic device.

However, the use of the conventional battery management system still has some drawbacks. For example, the battery management system has plural insertion slots to be electrically docked with plural battery units. Moreover, these battery units provide electric power to the main system sequentially. If the electric quantity of any battery unit is insufficient, it is necessary to replace the battery unit with a new one. However, for replacing the battery unit, the main system needs to be turned off, and the battery management system stops providing the electric power. Then, the battery unit with insufficient electric quantity can be removed and replaced with the new one. Since the main system needs to be disabled before the process of replacing the battery unit, the conventional battery management system is not user-friendly.

If the user removes any battery unit before the main system is turned off, the improper use may cause the interruption of the main system and damage the main system. Then, the main system is forced to be disabled. In other words, the conventional battery management system is not user-friendly, the main system is possibly damaged, and the use safety of the battery unit is reduced.

For overcoming the above drawbacks, there is a need of providing a novel and user-friendly battery management system for a main system.

SUMMARY OF THE INVENTION

For overcoming the drawbacks of the conventional technologies, the present invention provides a battery management system. The battery management system comprises a battery detachment protection device. The battery management system is electrically connected with a main system of an electronic device. The battery management system is capable of stopping or positioning battery units in the corresponding insertion slots. In response to a system protection sensing signal from the battery management system, the battery units are detached from the corresponding insertion slots or positioned in the corresponding insertion slots. Consequently, the problems of causing damage of the battery units and the main system through improper use will be solved.

In accordance with an aspect of the present invention, a battery management system for a main system of an electronic device is provided. The battery management system is electrically connected with plural battery units. The battery management system includes plural insertion slots and a battery detachment protection device. The plural insertion slots are electrically connected with the main system. The plural battery units are docked with the corresponding insertion slots, respectively. The battery detachment protection device is electrically connected with the main system. The plural battery units are stopped by the battery detachment protection device or positioned in the corresponding insertion slots. When an external force is applied to the battery detachment protection device, the battery detachment protection device generates a system protection sensing signal. In response to the system protection sensing signal, a power supply condition of at least one battery unit in the corresponding insertion slot is adjusted, and the at least one battery unit in the corresponding insertion slot is permitted to be detached from the corresponding insertion slot or positioned in the corresponding insertion slot.

In an embodiment, the battery detachment protection device includes a switch mechanism and a system protection sensing mechanism. The system protection sensing mechanism is electrically connected with the switch mechanism.

In response to the external force, a displacement of the switch mechanism is generated. In response to the displacement, the system protection sensing mechanism generates the system protection sensing signal to the main system. Consequently, the power supply condition of the at least one battery unit in the corresponding insertion slot is in one of an interruption or standby state and a normal working state.

In an embodiment, the system protection sensing mechanism includes at least one sensor.

In an embodiment, the system protection sensing mechanism includes plural sensors, which are located at entrance/exit positions of the corresponding insertion slots, respectively.

In an embodiment, the battery detachment protection device further includes plural stopping mechanisms. When the displacement of the switch mechanism is generated in response to the external force, at least one stopping mechanism of the plural stopping mechanisms is in one of a non-stopped state and a stopped state. Consequently, the corresponding at least one battery unit in the corresponding insertion slot is permitted to be detached from the corresponding insertion slot or positioned in the corresponding insertion slot.

In an embodiment, the plural stopping mechanisms are located at the entrance/exit positions of the corresponding insertion slots and linked with the switch mechanism. When the stopping mechanisms are ascended or descended, the entrance/exit positions of the corresponding insertion slots are stopped or opened.

In an embodiment, the switch mechanism includes at least one lever switch, at least one push button, at least one cover, or a combination thereof. In response to the displacement of the switch mechanism, the plural stopping mechanisms are correspondingly moved.

In an embodiment, the switch mechanism is mechanically connected with the plural stopping mechanisms or electrically connected with the plural stopping mechanisms.

In an embodiment, the battery detachment protection device includes a switch mechanism and plural stopping mechanisms. When a displacement of the switch mechanism is generated in response to the external force, at least one stopping mechanism of the plural stopping mechanisms is in one of a non-stopped state and a stopped state. Consequently, the corresponding at least one battery unit in the corresponding insertion slot is permitted to be detached from the corresponding insertion slot or positioned in the corresponding insertion slot.

In an embodiment, the battery detachment protection device further comprises a system protection sensing mechanism. The system protection sensing mechanism generates the system protection sensing signal to the main system in response to the external force. Consequently, the power supply condition of the at least one battery unit in the corresponding insertion slot is in one of an interruption or standby state and a normal working state.

In an embodiment, the battery detachment protection device further includes a system protection sensing mechanism. When the at least one stopping mechanism is in one of a non-stopped state and a stopped state, the system protection sensing mechanism generates the system protection sensing signal to the main system. Consequently, the power supply condition of the at least one battery unit in the corresponding insertion slot is in one of an interruption or standby state and a normal working state.

In an embodiment, the switch mechanism includes at least one lever switch, at least one push button, at least one cover, or a combination thereof, wherein in response to the displacement of the switch mechanism, the plural stopping mechanisms are correspondingly moved.

From the above descriptions, the present invention provides a battery management system for a main system of an electronic device. The battery management system is additionally equipped with a battery detachment protection device. By the battery detachment protection device, the battery units can be detached from or positioned in the corresponding insertion slots. Before the battery unit is detached from the corresponding insertion slot, an external force is applied to a switch system of the battery detachment protection device to generate a displacement. In response to the displacement of the switch mechanism, the system protection sensing mechanism notifies the main system. Consequently, the battery unit is in the interruption or standby state. In such way, the battery unit and the main system are protected effectively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
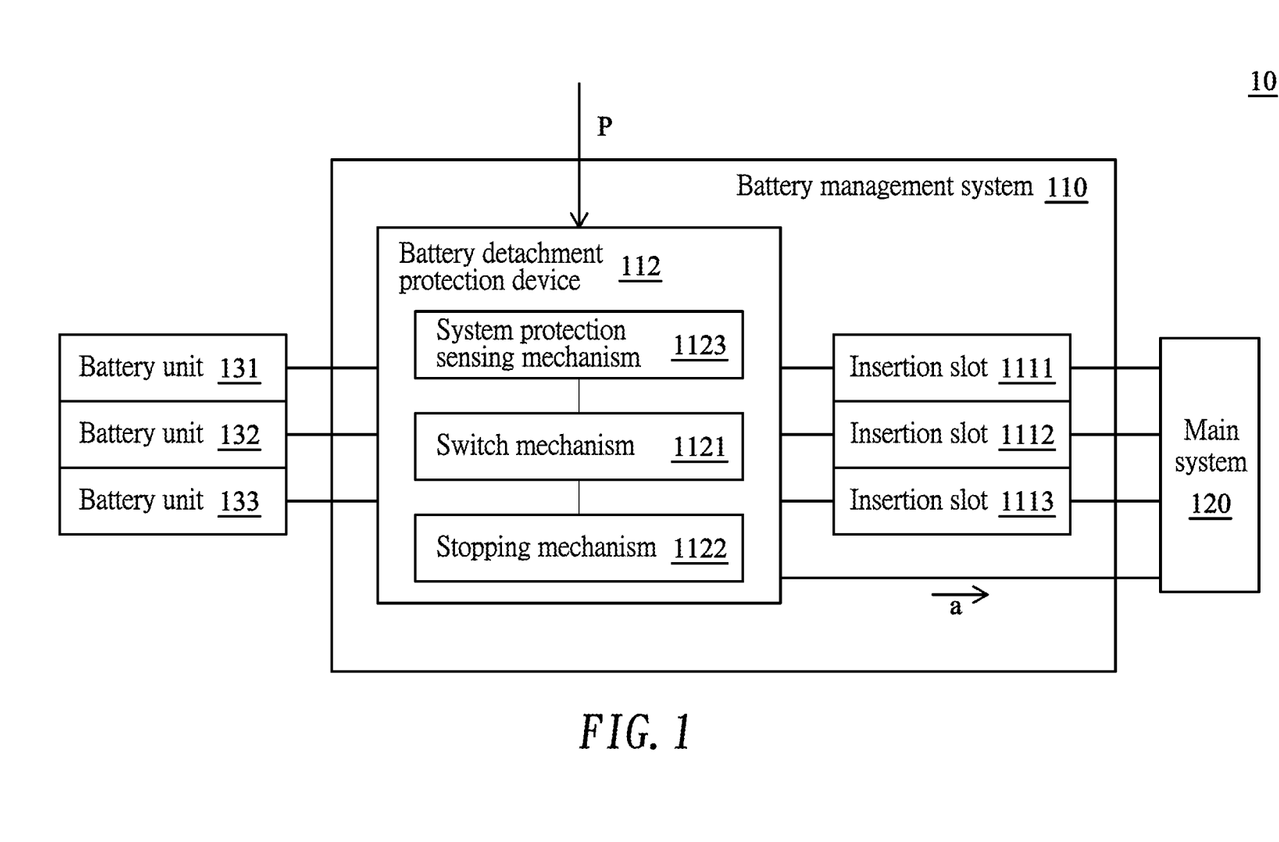
FIG. 1 is a schematic functional block diagram illustrating the concepts of a battery management system according to the present invention.

FIG. 1 is a schematic functional block diagram illustrating the concepts of a battery management system according to the present invention. The concepts of this embodiment will be described more specifically with reference to this drawing.

As shown in FIG. 1, the battery management system 110 is applied to an electronic device 10. The battery management system 110 is electrically connected with a main system 120. The battery management system 110 is electrically docked with plural battery units, which are located outside the battery management system 110. For succinctness, only the battery units 131~133 are shown. The battery management system 110 comprises plural insertion slots 1111~1113 and a battery detachment protection device 112. The battery detachment protection device 112 comprises a switch mechanism 1121, plural stopping mechanisms 1122 and a system protection sensing mechanism 1123. For succinctness, only one stopping mechanism 1122 is shown. The plural insertion slots 1111~1113 are electrically connected with the main system 120. The battery units 131~133 are docked with the insertion slots 1111~1113, respectively. Moreover, the battery units 131~133 provide electric power to the main system 120. In response to an external force P, a displacement of the switch mechanism 1121 of the battery detachment protection device 112 is generated. In response to the displacement, the power supply condition of the corresponding battery unit of the battery units 131~133 in the insertion slots 1111~1113 is adjusted. Consequently, the corresponding battery unit of the battery units 131~133 in the insertion slots 1111~1113 can be detached from the corresponding insertion slot or positioned in the corresponding insertion slot.

The switch mechanism 1121 is used for driving the stopping mechanisms 1122 and the system protection sensing mechanism 1123. The switch mechanism 1121 comprises at least one lever switch, at least one push button and/or at least one cover of the battery management system 110. The switch mechanism 1121 is mechanically connected with the stopping mechanisms 1122 or electrically connected with the stopping mechanisms 1122. The battery units 131~133 are placed into the corresponding insertion slots 1111~1113 through the entrance/exit positions of the corresponding insertion slots 1111~1113. Moreover, the stopping mechanisms 1122 are located at the entrance/exit positions of the corresponding insertion slots 1111~1113. In response to the displacement of the switch mechanism 1121, the stopping mechanisms 1122 are selectively in a non-stopped state or a stopped state. In the non-stopped state, the stopping mechanisms 1122 are descended. Consequently, the battery units in the corresponding insertion slots 1111~1113 can be detached from the corresponding insertion slots 1111~1113. In the stopped state, the stopping mechanisms 1122 are ascended. Consequently, the battery units can be positioned in the corresponding insertion slots 1111~1113. That is, since the stopping mechanisms 1122 are linked with the switch mechanism 1233, the stopping mechanisms 1122 can be correspondingly ascended or descended to stop or open the entrance/exit positions of the corresponding insertion slots 1111~1113. The system protection sensing mechanism 1123 is electrically connected with the switch mechanism 1121. In an embodiment, the system protection sensing mechanism 1123 comprises plural sensors, which are located at the entrance/exit positions of the corresponding insertion slots 1111~1113. When the displacement of the switch mechanism 112 is detected by the sensors, the sensors issue a system protection sensing signal (i.e., the signal "a") to the main system 120. In another embodiment, the system protection sensing signal is generated when the stopping mechanisms 1122 are switched to the non-stopped state or the stopped state. The system protection sensing signal is issued to the main system 120 to notify the main system. In response to the system protection sensing signal, the power supply condition of at least one battery unit of the battery units 131~133 in the corresponding insertion slots 1111~1113 is in one of an interruption or standby state and a normal working state under control of the main system 120.

Figure 2A:
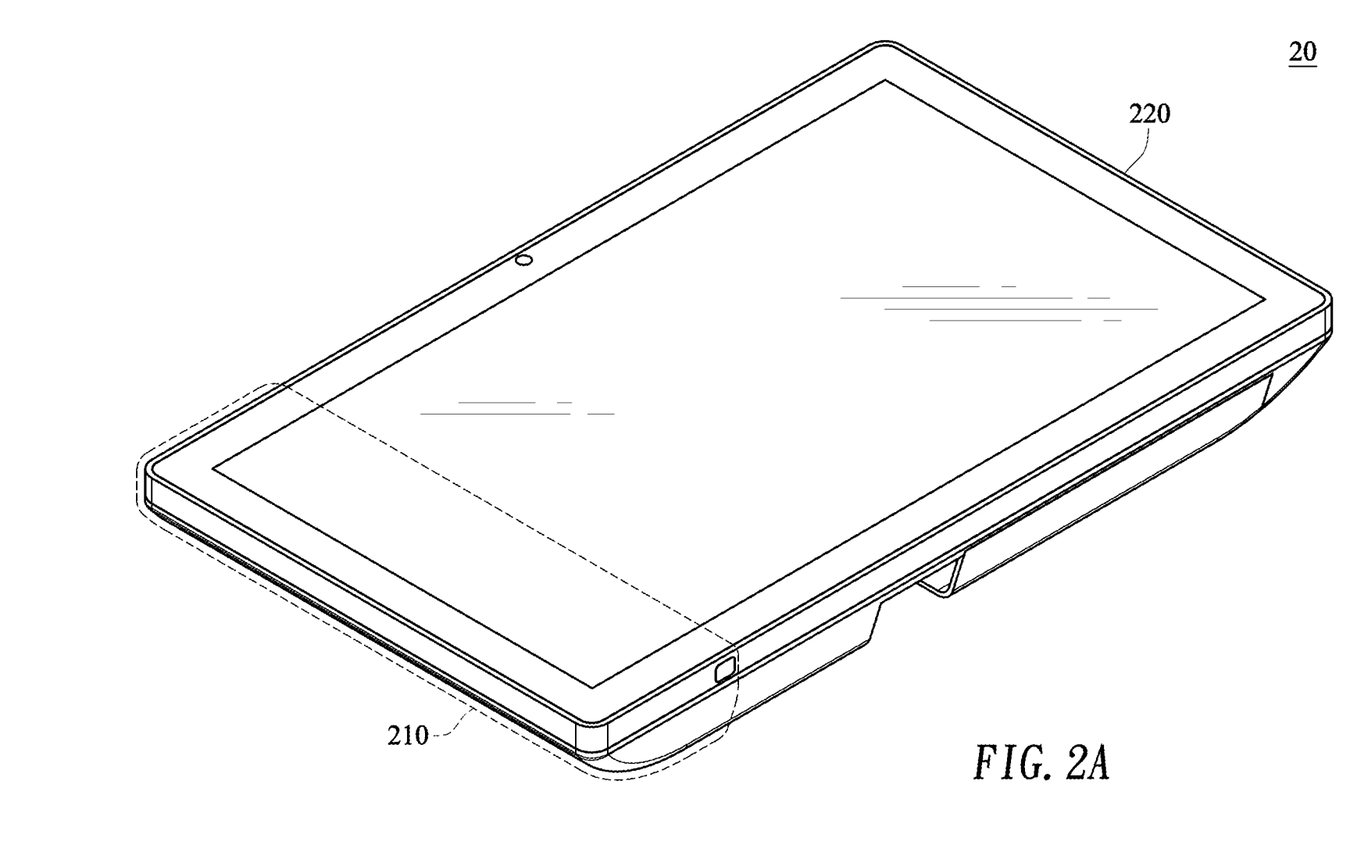
FIG. 2A is a schematic perspective view illustrating a battery management system using the concepts as shown in FIG. 1.
Figure 2B:
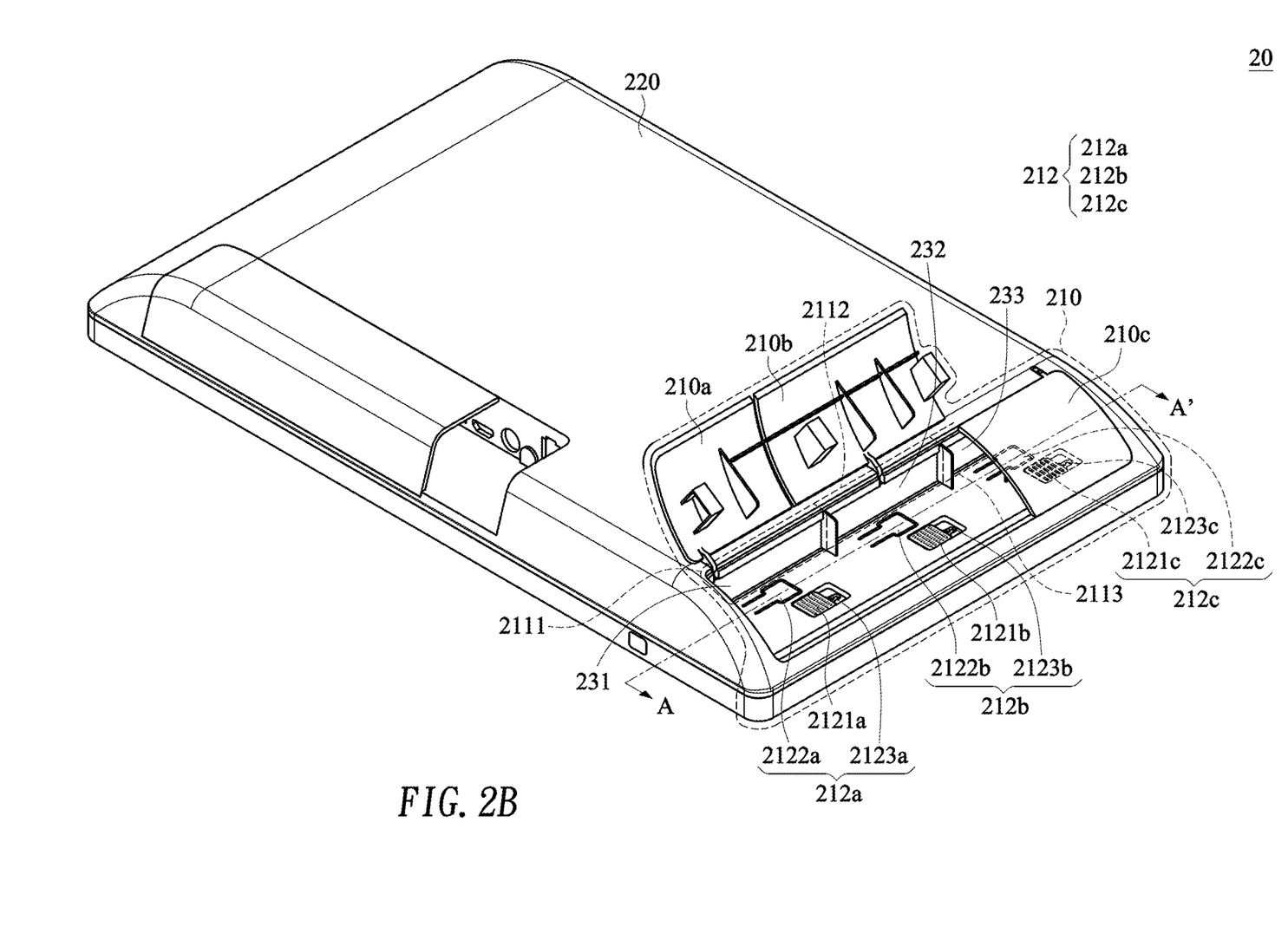
FIG. 2B is a schematic perspective view illustrating the battery management system as shown in FIG. 2A and taken along another viewpoint.

FIG. 2A is a schematic perspective view illustrating a battery management system using the concepts as shown in FIG. 1. FIG. 2B is a schematic perspective view illustrating the battery management system as shown in FIG. 2A and taken along another viewpoint. The concepts of this embodiment will be described more specifically with reference to these drawings.

Please refer to FIGS. 2A and 2B. The battery management system 210 is applied to an electronic device 20. The battery management system 210 is electrically connected with a main system 220. The battery management system 210 is electrically docked with plural battery units. For succinctness, only the battery units 231~233 are shown. The battery management system 210 comprises plural covers 210*a*~210*c*, plural insertion slots 2111~2113 and a battery detachment protection device 212. The battery detachment protection device 212 comprises a switch mechanism with plural switch units 2121*a*~2121*c*, plural stopping mechanisms 2122*a*~2122*c*, and a system protection sensing mechanism with plural sensing units 2123*a*~2123*c*. Moreover, the battery detachment protection device 212 comprises the protection units 212*a*, 212*b* and 212*c*. The protection unit 212*a* comprises the switch unit 2121*a*, the stopping mechanism 2122*a* and the sensing unit 2123*a*. The protection unit 212*b* comprises the switch unit 2121*b*, the stopping mechanism 2122*b* and the sensing unit 2123*b*. The protection unit 212*c* comprises the switch unit 2121*c*, the stopping mechanism 2122*c* and the sensing unit 2123*c*. The insertion slot 2111 is aligned with the cover 210*a* and the protection unit 212*a*. The insertion slot 2112 is aligned with the cover 210*b* and the protection unit 212*b*. The insertion slot 2113 is aligned with the cover 210*c* and the protection unit 212*c*. The plural insertion slots 2111, 2112 and 2113 are electrically connected with the main system. The battery units 231, 232 and 233 are docked with the insertion slots 2111, 2112 and 2113, respectively. Moreover, the battery units 231, 232 and 233 provide electric power to the main system 220.

Figure 2C:
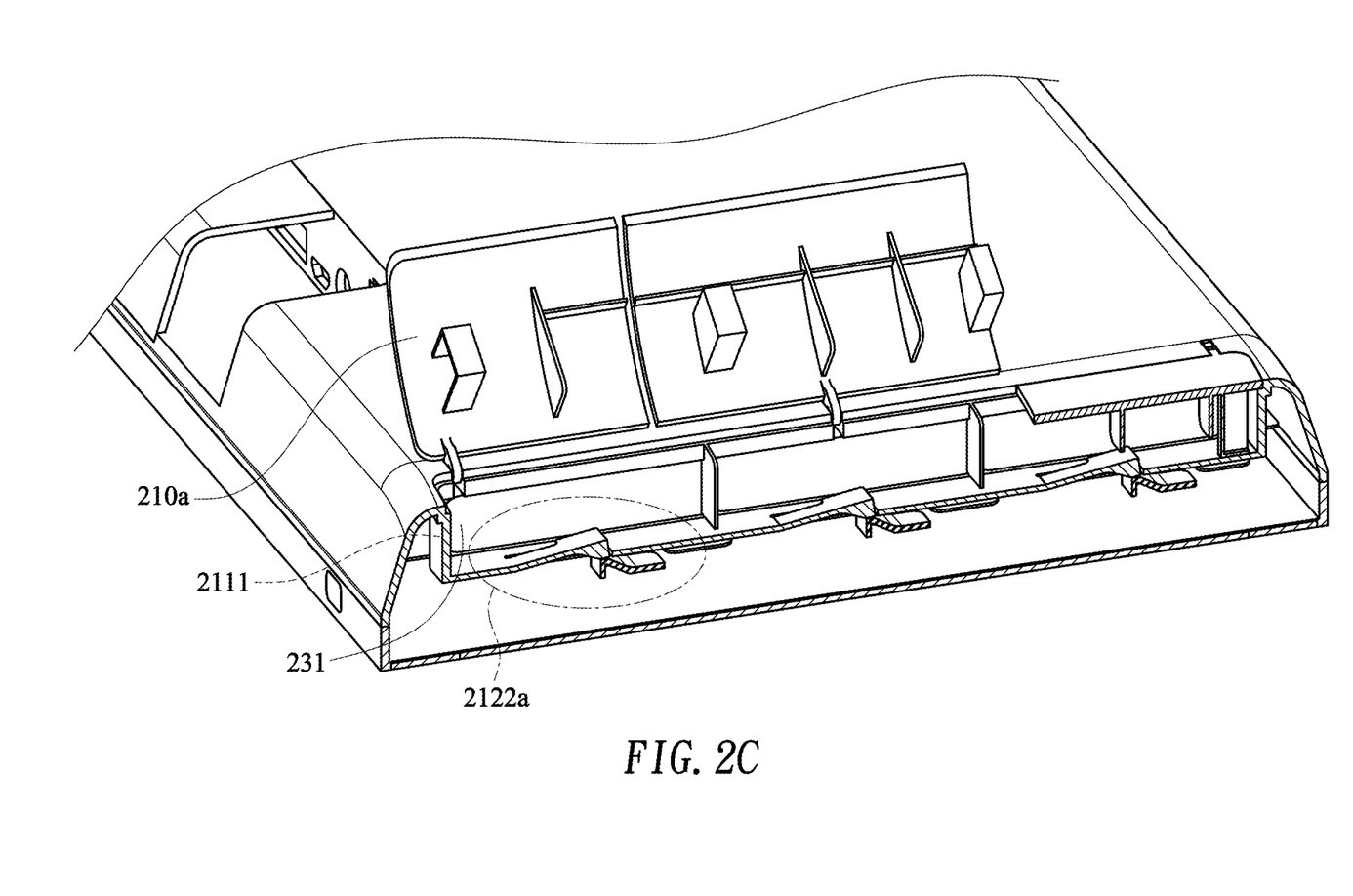
FIG. 2C is a schematic cutaway view illustrating a portion of the battery management system as shown in FIG. 2B and taken along the line AA'.
Figure 2D:
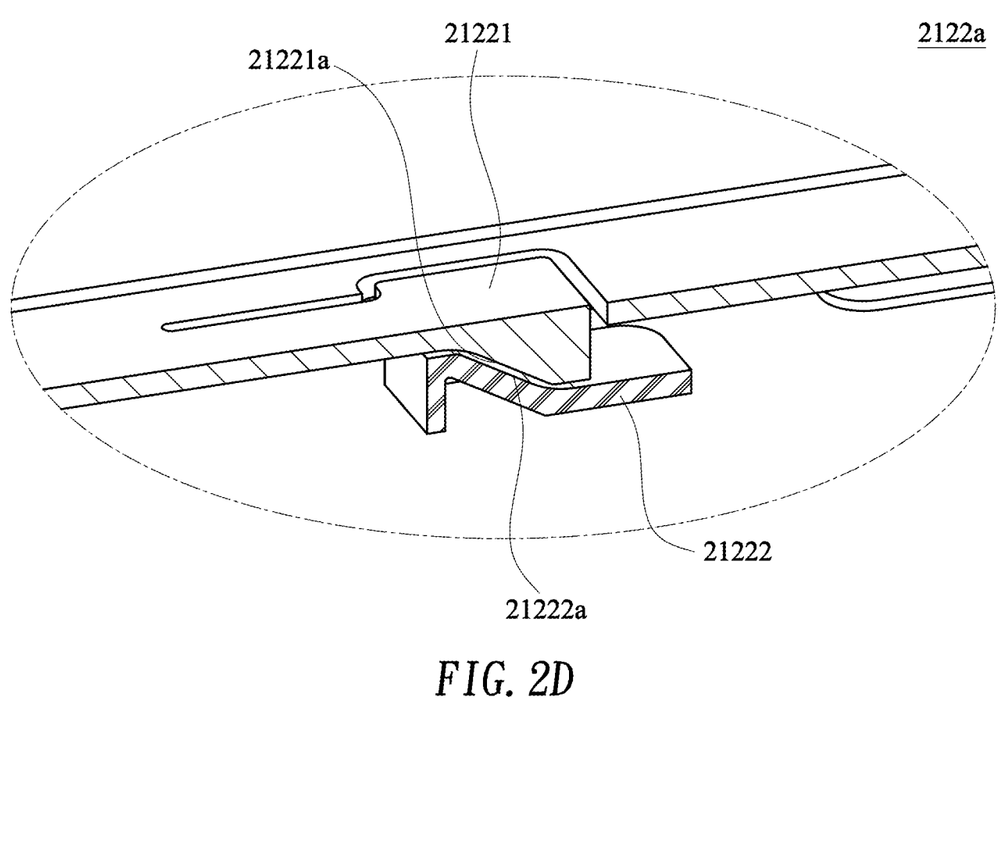
FIGS. 2D and 2E schematically illustrate the actions of the stopping mechanism as shown in FIG. 2C.
Figure 2E:
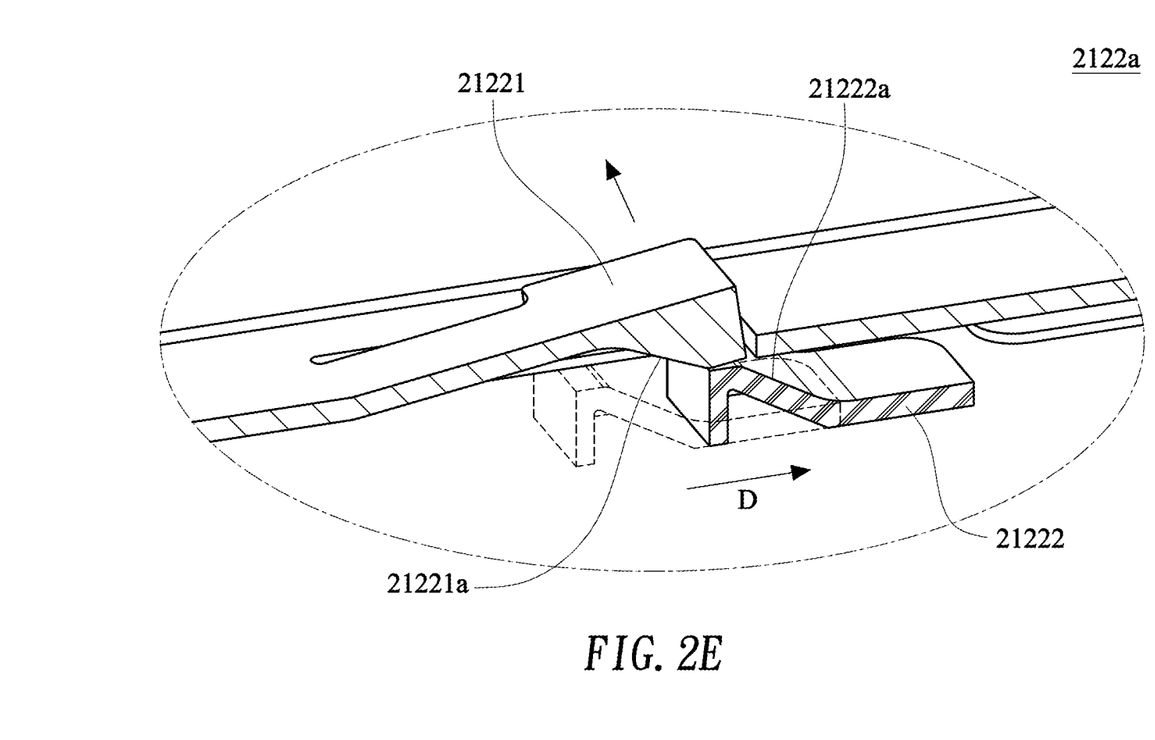

Please refer to FIGS. 2C, 2D and 2E. FIG. 2C is a schematic cutaway view illustrating a portion of the battery management system as shown in FIG. 2B and taken along the line AA'. FIGS. 2D and 2E schematically illustrate the actions of the stopping mechanism as shown in FIG. 2C. The operations of the associated components will be described more specifically with reference to these drawings.

Please refer to FIGS. 2A, 2B, 2C, 2D and 2E. In response to an external force, one of the switch units 2121*a*, 2121*b* and 2121*c* of the battery detachment protection device 212 is moved for a displacement D. In response to the displacement D, the power supply condition of the corresponding battery unit of the battery units 231, 232 and 233 in the insertion slots 2111, 2112 and 2113 is adjusted. Moreover, in response to the displacement D, the corresponding stopping mechanism of the stopping mechanisms 2122*a*, 2122*b* and 2122*c* at the entrance/exit positions of the insertion slots 2111, 2112 and 2113 is adjusted. Consequently, the corresponding battery unit of the battery units 231, 232 and 233 in the insertion slots 2111, 2112 and 2113 can be detached from the corresponding insertion slot or positioned in the corresponding insertion slot.

Please refer to FIGS. 2C, 2D and 2E. For illustration, the stopping mechanism 2122*a* as shown in FIG. 2C is taken an example. The stopping mechanism 2122*a* comprises a first stopping block 21221 and a second stopping block 21222. The first stopping block 21221 has a first slant surface 21221*a*. The second stopping block 21222 has a second slant surface 21222*a* corresponding to the first slant surface 21221*a* of the first stopping block 21221. When an external force is applied to the switch unit 2121*a* (see FIG. 2B) corresponding to the stopping mechanism 2122*a*, the switch unit 2121*a* is moved for the displacement D. In this embodiment, the second stopping block 21222 is linked with the switch unit 2121*a*. Consequently, in response to the displacement D, the second stopping block 21222 is correspondingly moved. While the second stopping block 21222 is moved, the first slant surface 21221*a* of the first stopping block 21221 is pushed by the second slant surface 21222*a* of the second stopping block 21222. Consequently, the first stopping block 21221 is correspondingly ascended and stopped at the entrance/exit position of the insertion slot 2111. Meanwhile, the battery unit 231 is positioned in the insertion slot 2111.

Moreover, when the switch unit 2121*a* generates the displacement in response to the displacement and the sensing unit 2123*a* senses the displacement of the switch unit 2121*a*, the sensing unit 2123*a* generates a system protection sensing signal to notify the main system 220. Under control of the main system 220, the battery unit 231 in the insertion slot 2111 is in an interruption or standby state.

In the above embodiment, the generation of the displacement of the switch unit 2121*a* can achieve the functions of enabling the stopping mechanism 2122*a* and issuing the system protection sensing signal simultaneously.

It is noted that numerous modifications and alterations may be made while retaining the teachings of the invention. Hereinafter, the operations of some variant examples of the battery detachment protection device 212 will be described as follows.

In a variant example, the switch mechanism 212 further comprises the covers 210*a*, 210*b* and 210*c*. When the cover 210*a* is opened in response to an external force, a displacement is generated. When the sensing unit 2123*a* senses the displacement of the cover 210*a*, the sensing unit 2123*a* generates a system protection sensing signal to notify the main system 220. Under control of the main system 220, the battery unit 231 in the insertion slot 2111 is in an interruption or standby state. By moving the switch unit 2121*a*, the first stopping block 21221 at the entrance/exit position of the insertion slot 2111 is correspondingly ascended because the second stopping block 21222 is linked with the switch unit 2121*a*. Consequently, the battery unit 231 in the insertion slot 2111 can be detached and removed.

In another variant example, the switch mechanism 212 further comprises the covers 210*a*, 210*b* and 210*c*, which are electrically connected with the corresponding stopping mechanisms. The cover 210*a* is electrically connected with the stopping mechanism 2122*a*. When the cover 210*a* is opened in response to an external force, a displacement is generated. When the sensing unit 2123*a* senses the displacement of the cover 210*a*, the sensing unit 2123*a* generates a system protection sensing signal to notify the main system 220. Under control of the main system 220, the battery unit 231 in the insertion slot 2111 is in an interruption or standby state. In this example, the stopping mechanism 2122*a* at the entrance/exit position of the insertion slot 2111 is descended according to an electronic driving method. Consequently, the battery unit 231 in the insertion slot 2111 can be detached and removed.

It is noted that numerous modifications and alterations may be made while retaining the teachings of the invention. The structures and specifications of the above components may be varied according to the practical requirements. As long as the functions of the present invention are achieved, the structures are not restricted.

From the above descriptions, the present invention provides a battery management system for a main system of an electronic device. The battery management system is additionally equipped with a battery detachment protection device. By the battery detachment protection device, the battery units can be detached from or positioned in the corresponding insertion slots. Before the battery unit is detached from the corresponding insertion slot, an external force is applied to a switch system of the battery detachment protection device to generate a displacement. In response to the displacement of the switch mechanism, the system protection sensing mechanism notifies the main system. Consequently, the battery unit is in the interruption or standby state. In such way, the battery unit and the main system are protected effectively.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A battery management system for a main system of an electronic device, the battery management system being electrically connected with plural battery units, the battery management system comprising:
    plural insertion slots electrically connected with the main system, wherein the plural battery units are docked with the corresponding insertion slots, respectively; and
    a battery detachment protection device electrically connected with the main system, and includes a switch mechanism and a system protection sensing mechanism electrically connected with the switch mechanism, wherein the plural battery units are stopped by the battery detachment protection device or positioned in the corresponding insertion slots, and the system protection sensing mechanism includes plural sensors, which are located at entrance/exit positions of the corresponding insertion slots, respectively,
    wherein when an external force is applied to the battery detachment protection device, a displacement of the switch mechanism is generated in response to the external force, the system protection sensing mechanism of the battery detachment protection device generates a system protection sensing signal to the main system, wherein in response to the system protection sensing signal, a power supply condition of at least one battery unit in the corresponding insertion slot is adjusted into one of an interruption or standby state and a normal working state, and the at least one battery unit in the corresponding insertion slot is permitted to be detached from the corresponding insertion slot or positioned in the corresponding insertion slot.

2. The battery management system according to claim 1, wherein the battery detachment protection device further comprises plural stopping mechanisms, wherein when the displacement of the switch mechanism is generated in response to the external force, at least one stopping mechanism of the plural stopping mechanisms is in one of a non-stopped state and a stopped state, so that the corresponding at least one battery unit in the corresponding insertion slot is permitted to be detached from the corresponding insertion slot or positioned in the corresponding insertion slot.

3. The battery management system according to claim 2, wherein the plural stopping mechanisms are located at the entrance/exit positions of the corresponding insertion slots and linked with the switch mechanism, wherein when the stopping mechanisms are ascended or descended, the entrance/exit positions of the corresponding insertion slots are stopped or opened.

4. The battery management system according to claim 2, wherein the switch mechanism comprises at least one lever switch, at least one push button, at least one cover, or a combination thereof, wherein in response to the displacement of the switch mechanism, the plural stopping mechanisms are correspondingly moved.

5. The battery management system according to claim 4, wherein the switch mechanism is mechanically connected with the plural stopping mechanisms or electrically connected with the plural stopping mechanisms.

6. A battery management system for a main system of an electronic device, the battery management system being electrically connected with plural battery units, the battery management system comprising:
    plural insertion slots electrically connected with the main system, wherein the plural battery units are docked with the corresponding insertion slots, respectively; and
    a battery detachment protection device electrically connected with the main system, and including a switch mechanism and plural stopping mechanisms, wherein the plural battery units are stopped by the battery detachment protection device or positioned in the corresponding insertion slots,
    wherein when an external force is applied to the battery detachment protection device, the battery detachment protection device generates a system protection sensing signal, and in response to the system protection sensing signal, a power supply condition of at least one battery unit in the corresponding insertion slot is adjusted, and
    wherein at least one stopping mechanism of the plural stopping mechanisms is in one of a non-stopped state and a stopped state in response to the external force, so that the corresponding at least one battery unit in the corresponding insertion slot is permitted to be detached from the corresponding insertion slot or positioned in the corresponding insertion slot.

7. The battery management system according to claim 6, wherein the battery detachment protection device further comprises a system protection sensing mechanism, wherein the system protection sensing mechanism generates the system protection sensing signal to the main system in response to the external force, so that the power supply condition of the at least one battery unit in the corresponding insertion slot is in one of an interruption or standby state and a normal working state.

8. The battery management system according to claim 6, wherein the battery detachment protection device further comprises a system protection sensing mechanism, wherein when the at least one stopping mechanism is in one of a non-stopped state and a stopped state, the system protection sensing mechanism generates the system protection sensing signal to the main system, so that the power supply condition of the at least one battery unit in the corresponding insertion slot is in one of an interruption or standby state and a normal working state.

9. The battery management system according to claim 6, wherein the switch mechanism comprises at least one lever switch, at least one push button, at least one cover, or a combination thereof, wherein in response to the displacement of the switch mechanism, the plural stopping mechanisms are correspondingly moved.

* * * * *